(12) United States Patent
Köhn et al.

(10) Patent No.: US 9,248,911 B2
(45) Date of Patent: Feb. 2, 2016

(54) VARIABLE-LENGTH RAIL COVER

(71) Applicant: Airbus Operations GmbH, Hamburg (DE)

(72) Inventors: Thorsten Köhn, Tornesch (DE); Carsten Wolgast, Adendorf (DE)

(73) Assignee: Airbus Operations GmbH (DE)

(*) Notice: Subject to any disclaimer, the term of this patent is extended or adjusted under 35 U.S.C. 154(b) by 116 days.

(21) Appl. No.: 14/047,078

(22) Filed: Oct. 7, 2013

(65) Prior Publication Data

US 2014/0097662 A1  Apr. 10, 2014

Related U.S. Application Data

(60) Provisional application No. 61/710,794, filed on Oct. 8, 2012.

(30) Foreign Application Priority Data

Oct. 8, 2012  (DE) .......................... 10 2012 218 312

(51) Int. Cl.
  *B64D 11/06*  (2006.01)
  *B60N 2/07*  (2006.01)
  (Continued)

(52) U.S. Cl.
  CPC .............. *B64D 11/06* (2013.01); *B60N 2/0725* (2013.01); *B60N 2/44* (2013.01); *B64C 1/20* (2013.01); *B64D 11/0624* (2014.12); *B64D 11/0696* (2013.01)

(58) Field of Classification Search
  CPC .......................... B64D 11/0696; B60N 2/0725
  USPC ........................ 244/118.5, 118.6, 121, 122 R; 297/463.1, 463.2
  See application file for complete search history.

(56) References Cited

U.S. PATENT DOCUMENTS 3,938,764 A * 2/1976 McIntyre .................. B64C 1/18
                                                          137/68.11
4,089,140 A * 5/1978 McIntyre .................. B64C 1/18
                                                          244/117 R
(Continued)

FOREIGN PATENT DOCUMENTS

CN      101454203 A      6/2009
CN      101516729 A      8/2009
(Continued)

OTHER PUBLICATIONS

Machine translation of DE 102009056414 A1, eSpacenet, Mar. 27, 2015.*

(Continued)

*Primary Examiner* — Ryan Kwiecinski
(74) *Attorney, Agent, or Firm* — Lerner, David, Littenberg, Krumholz & Mentlik, LLP

(57) ABSTRACT

A rail cover for a seat rail includes a cover element for completely covering a longitudinal portion of the seat rail. The cover element extends at least in part in a plane of extension that is formed by a longitudinal direction and a transverse direction of the rail cover and includes a first, rigid, longitudinal portion and a second longitudinal portion that follows on from the first longitudinal portion. The first longitudinal portion and the second longitudinal portion are mechanically coupled together by means of a flexible portion, wherein the second longitudinal portion is designed to carry out a pivoting movement in a direction across the plane of extension.

12 Claims, 3 Drawing Sheets

(51) Int. Cl.
    *B60N 2/44*     (2006.01)
    *B64C 1/20*     (2006.01)

(56) References Cited

U.S. PATENT DOCUMENTS

| | | | | |
|---|---|---|---|---|
| 4,936,527 A * | 6/1990 | Gorges | | B64D 11/0696 |
| | | | | 104/165 |
| 5,724,909 A * | 3/1998 | Pitman | | F21K 2/00 |
| | | | | 116/202 |
| 5,961,072 A * | 10/1999 | Bodle | | A62B 3/00 |
| | | | | 244/118.5 |
| 6,513,756 B1 * | 2/2003 | Lambiaso | | B64D 11/0696 |
| | | | | 244/118.5 |
| 6,527,566 B1 | 3/2003 | Lambiaso | | |
| 6,655,739 B2 * | 12/2003 | Furukawa | | B60N 2/015 |
| | | | | 248/429 |
| 7,182,292 B2 * | 2/2007 | Howard et al. | | 244/122 R |
| 7,191,981 B2 | 3/2007 | Laib et al. | | |
| 7,350,853 B2 * | 4/2008 | Fitze | | B62D 25/20 |
| | | | | 296/184.1 |
| 2002/0195523 A1 | 12/2002 | Cawley | | |
| 2004/0155168 A1 * | 8/2004 | Matsushiro | | B60N 2/0725 |
| | | | | 248/424 |
| 2005/0211833 A1 * | 9/2005 | Frantz | | B64C 1/20 |
| | | | | 244/118.1 |
| 2005/0247820 A1 * | 11/2005 | Feist | | B60N 2/06 |
| | | | | 244/118.6 |
| 2006/0016944 A1 * | 1/2006 | Howard | | B64D 11/0624 |
| | | | | 248/188.1 |
| 2006/0038071 A1 * | 2/2006 | Schoene | | B64D 11/0696 |
| | | | | 244/118.6 |
| 2006/0097109 A1 * | 5/2006 | Laib | | B64D 11/0696 |
| | | | | 244/118.6 |
| 2006/0102784 A1 * | 5/2006 | Callahan | | B60N 2/0725 |
| | | | | 244/118.6 |
| 2007/0018045 A1 * | 1/2007 | Callahan | | B64C 1/20 |
| | | | | 244/118.6 |
| 2011/0049296 A1 | 3/2011 | Roming et al. | | |
| 2014/0292018 A1 * | 10/2014 | Kinzer | | B60N 2/01575 |
| | | | | 296/65.03 |

FOREIGN PATENT DOCUMENTS

| | | | | |
|---|---|---|---|---|
| DE | 75 32 144 U | | 2/1976 | |
| DE | 42 04 523 A1 | | 8/1993 | |
| DE | 199 47 148 A1 | | 4/2001 | |
| DE | 10 2008 025 443 A1 | | 12/2009 | |
| DE | 10 2009 056 414 A1 | | 6/2011 | |
| DE | 102009056414 A1 * | | 6/2011 | ........... B60N 2/0725 |
| DE | 102012108979 A1 * | | 3/2014 | ................ B64C 1/20 |
| FR | 2927283 A1 * | | 8/2009 | ........... B60N 2/0725 |
| FR | WO 2014188087 A1 * | | 11/2014 | ........... B60N 2/01558 |
| GB | 1482482 A | | 8/1977 | |
| GB | 2433433 A | | 6/2007 | |
| JP | WO 2011010405 A1 * | | 1/2011 | ............... B60N 2/06 |
| JP | WO 2011145375 A1 * | | 11/2011 | ............. B60N 2/065 |

OTHER PUBLICATIONS

Chinese Office Action dated Apr. 27, 2015.

* cited by examiner

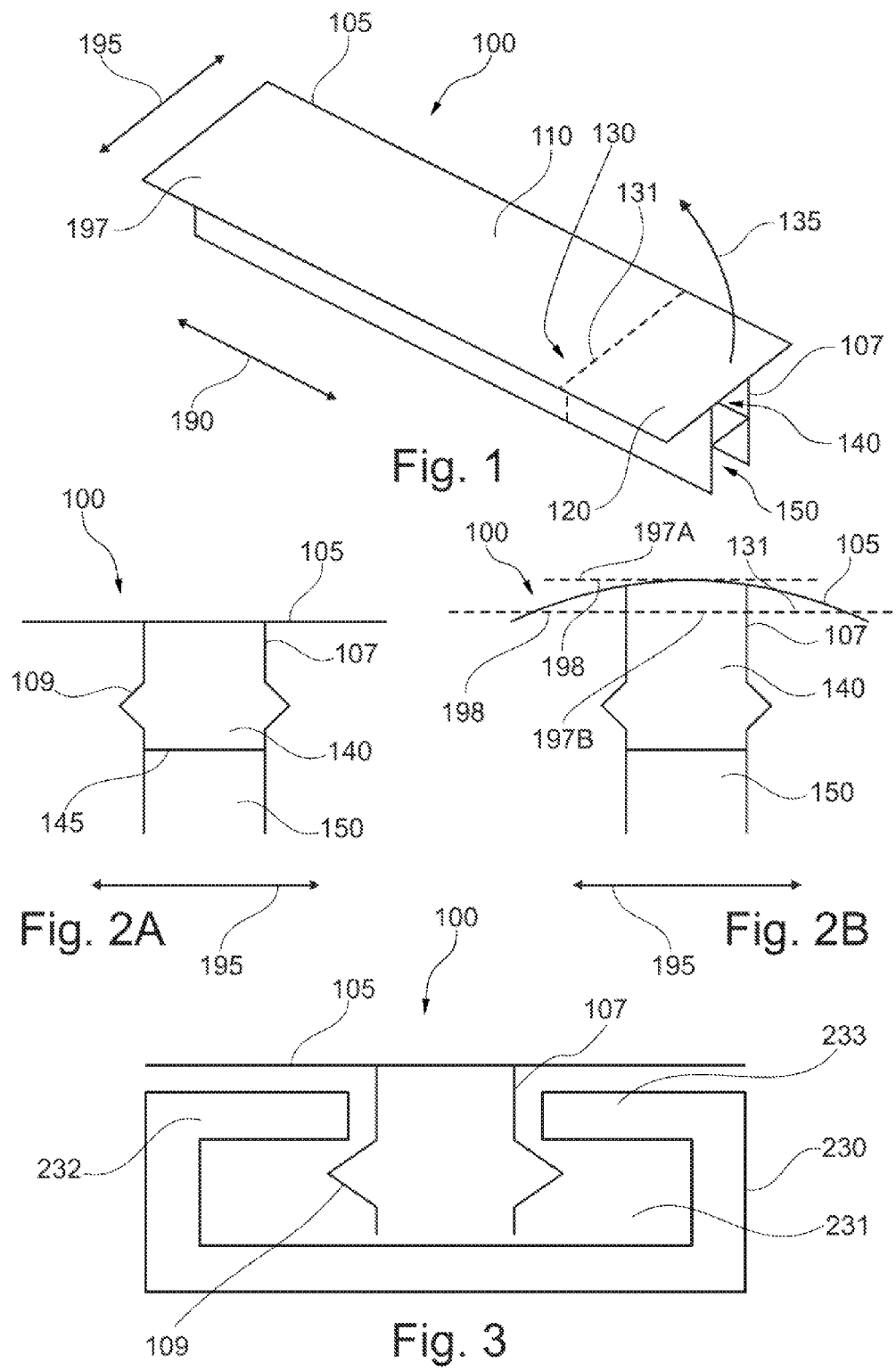

VARIABLE-LENGTH RAIL COVER

CROSS-REFERENCE TO RELATED APPLICATIONS

This application claims the benefit of the filing date of U.S. Provisional Patent Application No. 61/710,794, filed Oct. 8, 2012, the disclosure of which is hereby incorporated herein by reference.

FIELD OF THE INVENTION

The invention relates to rail covers. In particular, the invention relates to a rail cover for a seat rail, to a seat arrangement for a passenger cabin of a means of transport, and to an aircraft comprising a seat arrangement.

BACKGROUND OF THE INVENTION

Seat rails can be designed, in a passenger cabin of a means of transport, to mechanically couple one or several seats to the passenger cabin, and, in particular, to mechanically couple the structural elements arranged in the floor of the passenger cabin. In this arrangement a seat rail can make it possible for a seat to be displaced so that in the passenger cabin a seat configuration, and in particular the spacing of seats or seat rows arranged one behind the other, i.e. the seat pitch, can be adjusted. For this purpose the seat rail usually comprises an elongated extension in the direction of the desired direction of displacement of the seats.

In those cases where a seat rail is arranged in the floor of a passenger cabin, as a result of the seat rail it is possible, for example, for uneven regions to arise in the floor of the passenger cabin. In order to prevent such uneven regions in the passenger cabin from arising, or in order to reduce them, after completion of adjustment or completion of the seat configuration, in those areas of the seat rail where no seat leg is arranged a rail cover can be affixed to the seat rail so that the seat rail is not only protected against any ingress of foreign objects and dirt particles, but also forms an essentially flush surface with the floor that is arranged laterally to the seat rail.

US 2011/0049296 A1 describes a seat rail for attaching seats in aircraft. In this arrangement the seat rail comprises a region with an essentially C-shaped cross section, in which region a seat leg of a seat can be moved in the longitudinal direction of the seat rail.

DE 10 2009 056 414 A1 describes a rail arrangement for a motor vehicle seat with a rail attached to the vehicle floor, and a guide component that is attached or attachable to the motor vehicle seat and that is slidable in the longitudinal direction along the rail. In this arrangement a cover device for covering the rail is provided, which cover device comprises at least one ribbon-shaped sheet-like material for covering the rail.

US 2006/0097109 A1 describes a seat rail cover with telescopically displaceable regions that make it possible to adjust the length of the seat rail cover.

DE 7532144U describes a seat arrangement for motor vehicles with a slideable seat that can be displaced forwards or rearwards by means of seat adjusters, wherein each seat adjuster comprises an upper guide rail, attached to the seat frame, and a lower guide rail, attached to the vehicle floor, which seat adjusters are displaceable relative to each other by way of rolling elements or sliding elements.

BRIEF SUMMARY OF THE INVENTION

Stated are a rail cover for a seat rail, a seat arrangement for a passenger cabin of a means of transport, and an aircraft according to the characteristics of various embodiments of the invention.

According to a first aspect, a rail cover for a seat rail is stated, which rail cover comprises a cover element for completely covering a longitudinal portion of the seat rail. In this arrangement the cover element extends at least in part in a plane of extension that is formed by a longitudinal direction and a transverse direction of the rail cover. The cover element comprises a first, rigid, longitudinal portion and a second longitudinal portion that follows on from the first longitudinal portion, wherein the first longitudinal portion and the second longitudinal portion are mechanically coupled together by means of a flexible portion. In this arrangement the second longitudinal portion is designed to carry out a pivoting movement in a direction across the plane of extension.

The cover element can, in particular, be of a sheet-like design and can comprise a material thickness of some tenths of millimeters to a few millimeters. The cover element can be a metal or a metal alloy, for example based on aluminium or titanium or alloys thereof, or it can comprise plastics or be made of plastics.

The cover element is of a rigid construction, which means that it is designed so as not to be significantly deformed or not to be deformed at all as a result of external forces being exerted. For example with the use of the rail cover in a passenger compartment of a means of transport, the external forces being exerted can refer to the forces acting on the rail cover when a passenger steps on said rail cover.

In a first state the second longitudinal portion can extend in the longitudinal direction of the rail cover, namely in such a manner that the second longitudinal portion represents a continuation of the first longitudinal portion in the longitudinal direction of the rail cover. This means that the first longitudinal portion and the second longitudinal portion are arranged one behind the other in the longitudinal direction of the rail cover, and are mechanically coupled together. In the first state of the second longitudinal portion both the first longitudinal portion and the second longitudinal portion are situated in the plane of extension.

The first longitudinal portion can be shorter or longer than, or of identical length to, the second longitudinal portion.

From the first state of the second longitudinal portion the second longitudinal portion can be moved to a second state by means of a pivoting movement, wherein in the second state the second longitudinal portion is no longer in the plane of extension.

If the second longitudinal portion is moved from the first state to the second state by means of the pivoting movement, a rotational movement or a pivoting movement takes place on the flexible portion or on the connecting point between the first longitudinal portion and the second longitudinal portion, wherein the pivoting movement comprises at least one directional component that is perpendicular or orthogonal to the plane of extension so that the second longitudinal portion leaves the plane of extension as a result of the pivoting movement.

The flexible portion can be a joint or an elastic connection between the first longitudinal portion and the second longitudinal portion so that a pivoting movement of the second longitudinal portion relative to the first longitudinal portion becomes possible. In particular, a rotation axis of the pivoting movement of the second longitudinal portion can extend so as to be parallel to the transverse direction of the rail cover.

According to one embodiment, the second longitudinal portion comprises a plural number of pivoting elements that are arranged one behind the other in the longitudinal direction of the rail cover, wherein in each case two adjacent pivoting elements are mechanically coupled together by means of a flexible portion.

In this arrangement each one of the pivoting elements can assume the first state, as described above, and can assume a second state, which is pivoted relative to the first state, wherein in terms of the pivoting movement of each one of the individual pivoting elements the same applies as has been explained above in relation to the second longitudinal portion.

By moving a variable number of pivoting elements from the first state to the second state an elongation or length of the rail cover in the longitudinal direction of the rail cover can be influenced or set, because precisely by pivoting the pivoting elements the length of that part of the rail cover changes, which part extends in the plane of extension. Thus the length of the rail cover can be adjusted according to needs by the pivoting or folding-over of pivoting elements.

In one embodiment the first longitudinal portion can be identical in length to one of the pivoting elements of the second longitudinal portion. In this arrangement the pivoting elements can all be of the same length or can differ in length.

According to a further embodiment, the flexible portion defines a rotation axis on which the pivoting movement of the second longitudinal portion takes place, with said rotation axis extending so as to be parallel to the transverse direction of the rail cover.

As a result of this arrangement of the rotation axis relative to the transverse direction of the rail cover, the pivoting elements that are in the second state have an orthogonal alignment to the plane of extension when the rotational pivoting movement takes place by 90°, which means that the pivoting elements, starting from the first state, rotate by 90° and are then in the second state.

Furthermore, a rotation axis arranged in this manner has the effect that in a projection of the rail cover onto the plane of extension, no deficiencies of the pivoting elements that are in the second state takes place in the transverse direction of the rail cover.

The rotation axis can, of course, also encompass an angle other than 0° relative to the transverse direction of the rail cover; this means that the rotation axis extends across, or obliquely to, the transverse direction of the rail cover, wherein in this case when a pivoting element is moved from the first state to the second state a deflection of the pivoted pivoting elements in the direction of the transverse direction takes place.

According to a further embodiment, the rail cover comprises a cable channel that extends in the longitudinal direction of the rail cover.

The cable channel can be designed, for example, to accommodate cables for the transmission of electrical energy or signals. In this manner it is possible, for example, to avoid having to install an additional cable channel, wherein consequently installation space and mounting space can be saved.

According to a further embodiment, the cover element is curved in the transverse direction.

In this case the cover element and the plane of extension either have a tangential line or at least an intersecting line, wherein the rotation axis between the first longitudinal portion and the second longitudinal portion is formed by spot connections of the first longitudinal portion with the second longitudinal portion at or on the tangential line or the intersecting line or lines.

As a result of its curved design the rail cover can be adapted to the geometry of the seat rail. However, it is also possible to take into consideration other aspects, for example from the field of configuring a passenger cabin, according to which the course of the cover element in the transverse direction has to have a particular shape.

In other words the first longitudinal portion of the cover element represents the minimum length of the rail cover in the longitudinal direction, wherein this minimum length can be extended in that one or several pivoting elements of the second longitudinal portion can be pivoted from a second state to a first state, in which first state the pivoting elements also extend in the longitudinal direction of the rail cover. In this arrangement the individual pivoting elements of the second longitudinal portion can be identical in length or can differ in length.

In addition, the cover element can comprise a third longitudinal portion with a plural number of pivoting elements, wherein the first longitudinal portion, in the longitudinal direction of the rail cover, is arranged between the third longitudinal portion and the second longitudinal portion so that a longitudinal extension of the cover element can take place by moving the pivoting elements from the first state to the second state on the second longitudinal portion or on the third longitudinal portion.

In other words the longitudinal extension of the cover element can be carried out by pivoting the pivoting elements, which are arranged on both longitudinal ends of said cover element.

According to a further aspect, a seat arrangement for a passenger cabin of a means of transport is stated, wherein the seat arrangement comprises a seat rail, a first seat, a second seat and a rail cover as described above and below. In this arrangement the second seat is arranged behind the first seat in the longitudinal direction of the seat rail, wherein the first seat and the second seat are designed to be moved in an accommodation space of the seat rail in each case in the longitudinal direction of the seat rail, and wherein the rail cover is arranged to completely cover the accommodation space of the seat rail on a seat-rail longitudinal portion between the first seat and the second seat.

The seat-rail longitudinal portion between the first seat and the second seat is thus covered by the first longitudinal portion and by the pivoting elements that are in the first state. If this seat-rail longitudinal portion does not correspond to the total extension or total length of the first longitudinal portion and of the second longitudinal portion of the cover element, and if said seat-rail longitudinal portion is, in particular, shorter than the aforesaid, a defined number of pivoting elements can be pivoted from the first state to the second state, and the length of the cover element in the longitudinal direction of the seat rail can be adjusted to the distance between the first seat and the second seat.

According to one embodiment, the rail cover comprises a fixing element, wherein the fixing element is arranged on the cover element and extends in the longitudinal direction of the rail cover, and wherein the fixing element is designed to fix the rail cover with reference to the seat rail.

The fixing element extends, in particular, orthogonally from the cover element in the direction of the seat rail and is designed to engage the accommodation space of the seat rail or of attachment device on the seat rail, or to be mechanically coupled to the aforesaid. In this arrangement the fixing element may carry out the role of positioning the rail cover relative to the seat rail, and of preventing or rendering difficult any displacement of the rail cover in the transverse direction or in the longitudinal direction of the seat rail.

According to a further embodiment, the cable channel extends in the fixing element.

In this manner the accommodation space of the seat rail or the seat rail can be used as installation space or mounting space for a cable, without this impeding the function of the seat rail or of the rail cover in terms of accommodating seats.

According to a further embodiment, the first seat and the second seat in each case comprise a seat leg that mechanically couples the first seat or the second seat to the seat rail, wherein the first longitudinal portion of the rail cover projects in the direction of the seat leg of the first seat, and wherein the second longitudinal portion of the rail cover projects in the direction of the seat leg of the second seat. In this arrangement the second longitudinal portion of the rail cover is arranged to carry out the pivoting movement when the second seat is moved in the direction of the first seat, so that as a result of the pivoting movement the second longitudinal portion is moved from a state in which it covers the seat rail to a state in which it does not cover the seat rail.

In the above-mentioned first state the pivoting elements cover the seat rail, wherein in the above-mentioned second state they do not cover the seat rail, thus in the first case being in the covering state, and in the second case being in the non-covering state.

In this arrangement the seat leg of the second seat can comprise a lifting element that in the longitudinal direction of the seat rail projects in the direction of the first seat and is arranged to penetrate between the cover element of the rail cover and the seat rail when the second seat is moved in the direction of the first seat, thus causing the pivoting movement of the pivoting elements from the first state to the second state or from the covering state to the non-covering state. The further the second seat is moved in the direction of the first seat the greater is the number of pivoting elements of the cover element or of the second longitudinal portion of the cover element that are pivoted, so that flexibility in the seat configuration results in that, despite movement of a seat, the rail cover does not have to be removed, and the seat rail between the first seat and the second seat is nevertheless completely covered during re-arrangement of the seat configuration.

Conversely, in other words in the case of movement of the second seat away from the first seat, one pivoting element or several pivoting elements of the pivoting elements that are not in the covering state is/are led to the covering state. This movement of the pivoting elements to the covering state can, for example, be supported by an elastic characteristic of the flexible portion or of the elastic characteristic of the flexible portions or of the articulated connection between the pivoting elements or between the second longitudinal portion and the first longitudinal portion, wherein the elastic connection can be a spring element or a clamping element that moves the pivoting elements to the covering state.

In one embodiment the first longitudinal portion can comprise a length of approx. 73 cm to 74 cm, which approximately equates to 29 inches, and the second longitudinal portion can comprise a length of 15 cm to 16 cm, which approximately equates to six inches. In this arrangement the pivoting elements can, in particular, in each case comprise a length of 2.54 cm, which equates to one inch, so that the distance between the first seat and the second seat can be changed from a less generous spacing arrangement with a seat pitch of 73 cm to 74 cm to a more generous spacing arrangement with a seat pitch of 88 cm to 89 cm, which approximately equates to 35 inches. In this arrangement the above-mentioned length of 15 cm to 16 cm or six inches of the second longitudinal portion represents the difference in length between the less generous seat spacing arrangement and the more generous seat spacing arrangement.

In this arrangement the length of a pivoting element can, for example, be matched to the grid spacing of the seat rail, wherein the grid spacing or the grid denotes the distance between two fixing positions, or the individual fixing positions of the seats relative to the seat rail, in other words during any change in the seating configuration a seat is always displaced by an entire grid position in the longitudinal direction of the seat rail. In this arrangement in a reduction of the seat pitch in each case a pivoting element is pivoted from the covering state to the non-covering state, or in the case of an increase in the seat pitch is pivoted from the non-covering state to the covering state.

In one embodiment the rail cover can be designed to be aligned so as to be flush with a floor of the passenger cabin, in which floor the seat rail covered by the rail cover is integrated, so that no uneven regions in the floor or no elevations in the floor are caused by the rail cover installed to the seat rail. In other words, a floor covering or a plural number of floor panels of the floor together with the cover element of the rail cover form a common flat surface, i.e. they extend in one surface plane.

According to a further embodiment, during the pivoting movement the second longitudinal portion of the rail cover moves along the seat leg of the second seat in the direction of a seat surface of the second seat.

The pivoting elements of the second longitudinal portion, which pivoting elements are not in the covering state, thus extend along the seat leg of the second seat. In particular, the orientation of the rotation axis between the pivoting elements can be adjusted to the extension of the seat leg, i.e. the position of the rotation axis with reference to the transverse direction of the rail cover can be changed so that a direction of pivoting of the pivoting elements pivoted to the non-covered state can match the design of the seat leg. A seat leg that extends perpendicularly relative to the plane of extension requires a rotation axis that extends parallel to the transverse direction, wherein a seat leg that extends transversely to the plane of extension requires a corresponding angle between the rotation axis and the transverse direction of the rail cover.

In other words, in this process the overall length of the cover element is thus distributed in such a manner that part of the cover element covers the seat rail between the first seat and the second seat, and that part of the cover element that is not used for this extends along a seat leg and in this arrangement, in particular starting from the seat rail, projects into a direction jutting out from the aforesaid.

According to a further embodiment, a cover housing is arranged on the seat leg of the second seat, which cover housing is designed to cover the second longitudinal portion of the rail cover in the state in which it does not cover the seat rail.

For example, in order to arrange the pivoting elements in the non-covering state so that they are not accessible to passengers, the pivoting elements that are in the non-covering state are arranged in the cover housing.

According to a further embodiment, the seat arrangement comprises a signal transmission line that extends from the first seat to the second seat, wherein the signal transmission line extends in the cable channel of the rail cover.

The signal transmission line can, for example, be used to supply energy and data to electrical appliances located on the seat.

According to a further embodiment, the second seat comprises a cable accommodation space, wherein the cable accommodation space is designed to accommodate a longitudinal portion of the signal transmission line when the second seat is moved in the direction of the first seat.

Just as a so-called excessive length of the cover element results when the second seat is moved in the direction of the first seat, which excessive length is compensated for in that the pivoting elements are pivoted from the covering state to the non-covering state, during this movement a so-called excessive length also results in the signal transmission line which leads, for example, to the second seat. This excessive length of the signal transmission line during movement of the second seat in the direction of the first seat needs to be accommodated in an accommodation volume that is provided by the cable accommodation space. In this arrangement the cable accommodation space can be a hollow space in, on or underneath the seat shell or even in a seat leg of the second seat.

According to a further embodiment, the seat arrangement comprises an electrical connecting element that is designed to establish an electrical connection to the signal transmission line for the purpose of transmitting electrical signals. In this arrangement the electrical connecting element is arranged on the first seat or on the second seat.

The electrical connecting element can, for example, be a connector, wherein the signal transmission line comprises a matching counterpart to the connector so that an electrical connection can be established between the signal transmission line and the connector. In a state in which the counterpart is attached to the connector, the connector and the counterpart can, for example, also engage each other mechanically so that the connector and the signal transmission line in the attached state are mechanically fixed relative to each other.

All the seats of the seat arrangement can comprise a mechanical connecting element so that in each case a signal transmission line extends between two seats. Likewise, the mechanical connecting element can be arranged in, on or underneath a seat, for example also in a hollow space underneath a seat surface or seat shell of a seat.

According to a further aspect, an aircraft is stated which comprises a seat arrangement as described above and below.

The seat arrangement as described above and below can also be designed for use in other means of transport designed for passenger transport, for example in trains, buses, ships or boats, and in aircraft.

Below, exemplary embodiments of the invention are described with reference to the figures.

BRIEF DESCRIPTION OF THE DRAWINGS

FIG. 1 shows an isometric view of a rail cover according to an exemplary embodiment of the invention.

FIG. 2A shows a cross-sectional view of a rail cover according to an exemplary embodiment of the invention.

FIG. 2B shows a cross-sectional view of a rail cover according to an exemplary embodiment of the invention.

FIG. 3 shows a cross-sectional view of a seat rail with a rail cover according to an exemplary embodiment of the invention.

DETAILED DESCRIPTION

Figure 4A:
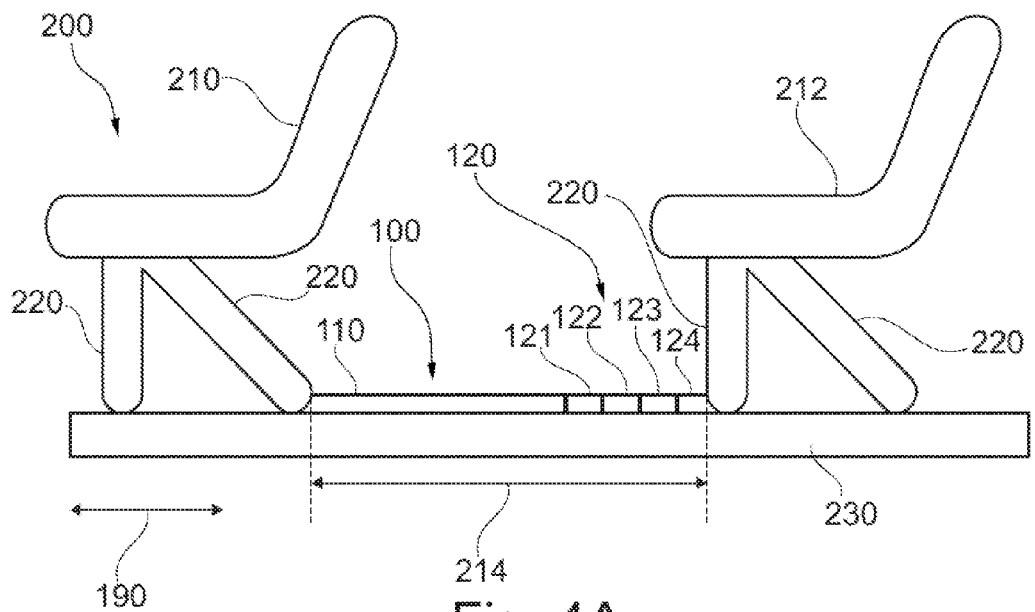
FIG. 4A shows a diagrammatic view of a seat arrangement according to an exemplary embodiment of the invention.

The illustrations in the figures are diagrammatic and not to scale. If in the following description of the figures the same reference characters are used, they relate to identical or similar elements.

FIG. 1 shows a rail cover 100 comprising a cover element 105 and a fixing element 107. The rail cover 100 comprises a first longitudinal portion 110 and a second longitudinal portion 120, wherein the first longitudinal portion and the second longitudinal portion are interconnected or mechanically coupled to each other by way of the flexible portion 130. The second longitudinal portion 120 is designed to carry out a pivoting movement in the direction of the arrow 135 on the rotation axis 131, which is formed by the flexible portion 130.

In this arrangement the overall length in the longitudinal direction of the rail cover corresponds to the sum of the length of the first longitudinal portion and of the second longitudinal portion when the second longitudinal portion is in the first state, as is illustrated in FIG. 1. In this arrangement the overall length of the rail cover can be reduced in that the second longitudinal portion 120 is pivoted in the direction of the arrow 135 whereby the length of the cover element in the longitudinal direction 190 is essentially defined by the first longitudinal portion 110.

The cover element 105 is a sheet-like structure that extends in the plane of extension 197, wherein the plane of extension 197 is defined by the longitudinal direction 190 and the transverse direction 195 of the rail cover 100.

The fixing element 107 comprises a first cable duct or first cable channel 140 and a second cable duct or second cable channel 150. In this arrangement the fixing element 107 and the cable channels 140, 150 extend in the longitudinal direction of the rail cover, and in particular along the entire length of the rail cover.

FIG. 2A shows a cross-sectional view of the rail cover 100. The fixing element 107 is formed by two opposing walls that extend perpendicularly from the cover element 105, wherein between the walls of the fixing element the first cable channel 140 and the second cable channel 150 are located, which are divided by a partition wall 145. The partition walls of the fixing element in each case comprise a retaining lug 109, wherein the retaining lug 109 of one wall of the fixing element represents a protrusion which in each case points away from the other wall of the fixing element 107. The retaining lugs 109 thus represent an enlargement in the cross section of the fixing element 107 so that the fixing element can engage the seat rail. In this arrangement the enlargement of the cross section of the fixing element 107 is a width of the fixing element 107, which width increases in the transverse direction 195 of the rail cover.

For the easy insertion or removal of a cable into or from the first cable channel, the partition wall 145 can comprise two sheet-like wall sections, wherein the wall sections in each case extend in the longitudinal direction of the rail cover and during movement of the sidewalls of the fixing element in the transverse direction of the rail cover in each case are moved away from each other so that an opening between the two wall sections results, which opening extends in the longitudinal direction, through which opening the cable can be inserted into, or removed from, the cable channel.

FIG. 2B in a manner comparable to FIG. 2A shows a cross-sectional view of a rail cover, wherein the cover element 105 of the rail cover 100 in FIG. 2B is curved in the transverse direction 195 of the rail cover 100. In the transverse direction of the rail cover the course of the cover element can, for example, follow a circular path or an elliptical path.

Furthermore, FIG. 2B shows the manner in which the plane of extension can be arranged relative to the cover element 105. Corresponding to the arrangement of the planes of extension 197A, 197B a corresponding position of the rotation axis 131 results during a pivoting movement of the second longitudinal portion relative to the first longitudinal portion of the rail cover. In the transverse direction of the rail cover the rotation axis 131 of the pivoting movement extends in the respective plane of extension; for the sake of clarity in FIG. 2B it is only shown in respect of the plane of extension 197B.

In a first exemplary embodiment the plane of extension 197A touches the cover element 105 so that at the contact line of the plane of extension with the cover element an intersecting line or tangential line 198 results that extends in the longitudinal direction of the cover element.

In a second embodiment variant the plane of extension 197B intersects the curved course of the cover element 105 in the transverse direction 195 at two points, which in this case are used as centres of rotation of the pivoting movement of the second longitudinal portion.

The points of intersection or points of contact of the plane of extension with the cover element in the region in which the first longitudinal portion and the second longitudinal portion adjoin can serve as a point-like connection between the first longitudinal portion and the second longitudinal portion so that in a curved gradient of the cover element in the transverse direction of the rail cover likewise a pivoting movement in the direction 135 of the second longitudinal portion can be made possible.

FIG. 3 shows a cross-sectional view of a rail cover 100 that has been arranged to cover an accommodation space 231 of a seat rail 230. The accommodation space 231 of the seat rail 230 is formed by a first projection 232 and by a second projection 233, wherein the cover element 105 in particular covers a space located between the first projection 232 and the second projection 233. The fixing element 107 and in particular the retaining lugs 109 were moved through the space between the first projection 232 and the second projection 233 in the direction of the accommodation space 231, and consequently the retaining lugs 109 have engaged the first projection or the second projection, and pulling the rail cover 100 from the seat rail is only possible against a certain holding resistance of the retaining lugs.

FIG. 4A shows a seat arrangement 200 comprising a first seat 210 and a second seat 212, wherein the first seat and the second seat are arranged in the seat rail 230, and the second seat 212 is arranged behind the first seat 210 when viewed in the longitudinal direction 190 of the seat rail 230. Each seat 210, 212 is mechanically coupled to the seat rail 230 by way of two seat legs so that the seats provide a degree of freedom of movement only in the longitudinal direction of the seat rail.

The seat-rail longitudinal portion 214, which is located between the rear seat leg of the first seat 210 and the front seat leg of the second seat 212, is covered by a rail cover 100 as described above and below. In this arrangement the rail cover comprises a first longitudinal portion 110 and a second longitudinal portion 120, wherein the second longitudinal portion 120 comprises four pivoting elements 121, 122, 123, 124. In this arrangement all the pivoting elements of the second longitudinal portion are in the first state, in other words in the state in which they cover the seat rail 230.

Figure 4B:
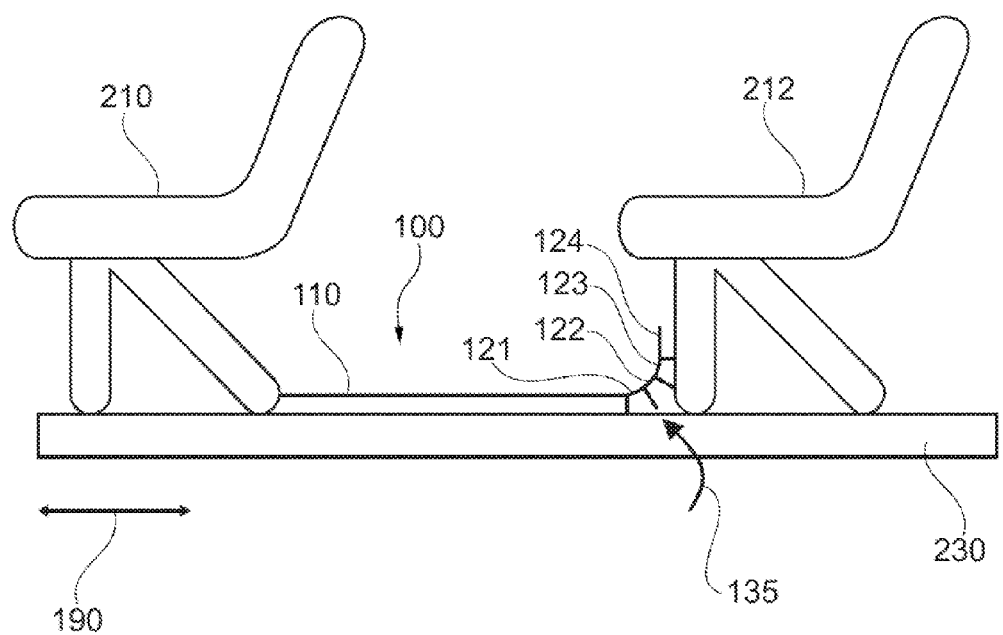
FIG. 4B shows a diagrammatic view of a seat arrangement according to an exemplary embodiment of the invention.

FIG. 4B shows a diagrammatic view of a seat arrangement 200 according to FIG. 4A, wherein the second seat 212 has been moved in the direction of the first seat 210 when compared to the situation shown in FIG. 4A.

As a result of the movement of the second seat 212 in the longitudinal direction 190 of the seat rail 230 in the direction of the first seat the pivoting elements 122, 123, 124 were pivoted from the covering state to the non-covering state in the direction 235. The first longitudinal portion 110 of the rail cover 100 and the pivoting element 121 are in the state in which they cover the seat rail 230.

FIGS. 4A, 4B illustrate that the seat pitch or the space between the first seat and the second seat 212 can be selected so as to be variable and can be matched to the seat configuration without this necessitating any change or adaptation of a rail cover that covers the seat rail between the first seat and the second seat.

Figure 4C:
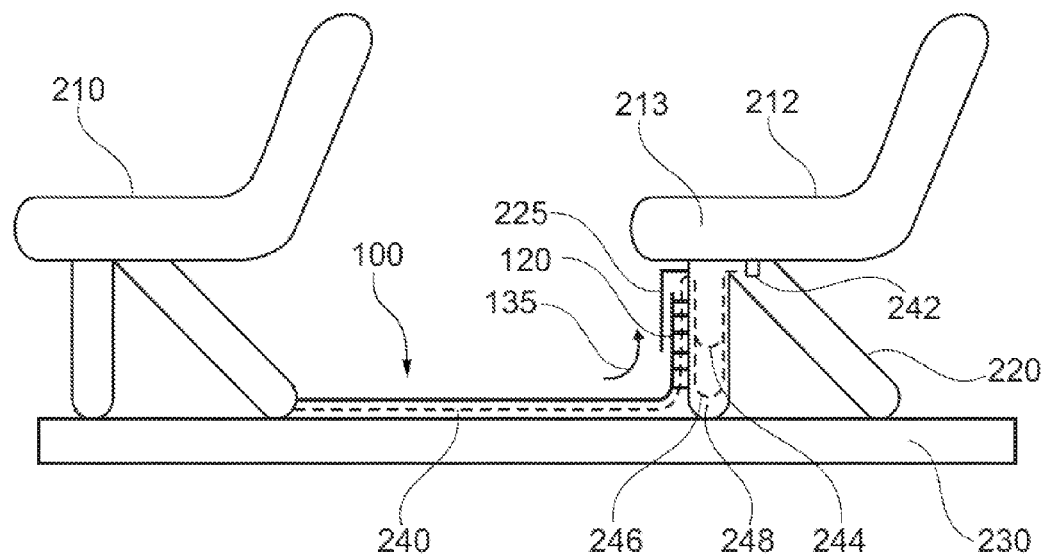
FIG. 4C shows a diagrammatic view of a seat arrangement according to an exemplary embodiment of the invention.

FIG. 4C shows a seat arrangement 200, wherein on the second seat 212 a cover housing 225 is arranged, and in a seat leg 220 of the second seat a cable accommodation space 248 is arranged. In the longitudinal direction of the seat rail 230 or of the rail cover 100 the routing of a signal transmission line from the first seat 210 to the second seat 212 is indicated by a dashed line 240. During a pivoting movement 135 of the pivoting elements of the second longitudinal portion of the rail cover the signal transmission line 240 is also routed in the direction of pivoting 135. In this process the longitudinal portion of the signal transmission line, by which portion the space between the second seat 212 and the first seat 210 has shortened, is accommodated in the cable accommodation space 248. The variability of the distance of the second seat from the first seat, and correspondingly the variation of the longitudinal portion of the signal transmission line in the cable accommodation space 248, is illustrated by the first inserted position 244 and by the second inserted position 246, which differs from the first inserted position 244, wherein the second inserted position 246 represents a longer longitudinal portion of the signal transmission line in the cable accommodation space, which corresponds to a shorter or smaller distance between the second seat 212 and the first seat 210 than is the case in the first inserted position 244.

In the non-covering state the pivoting elements of the second longitudinal portion of the rail cover extend along a seat leg of the second seat 212 in the direction of the seat surface or seat shell 213 of the second seat.

On the second seat 212 a cable connection 242, for example a connector, is shown, to which the signal transmission line 240 is mechanically and electrically coupled. The connector 242 is thus in a protected position so that it is not subjected to mechanical loads, for example as a result of being touched by passengers, or is protected from the aforesaid. The cable channel of the rail cover thus merely needs to be designed to accommodate the cable, rather than additionally also having to take into account the dimensions of a connecter, and consequently the rail cover overall can be designed or dimensioned so as to be smaller.

Although in the figures a rail cover with pivoting elements on one end of the first longitudinal portion is shown, the rail cover can of course comprise one pivoting element or a plural number of pivoting elements on both ends of the first longitudinal portion. For example, the pivoting elements can also be moved on the rear seat leg of the first seat from the covering state to the non-covering state. This can take place alternatively or additionally to moving the pivoting elements from the covering state to the non-covering state on the front seat leg of the second seat.

Figure 5:
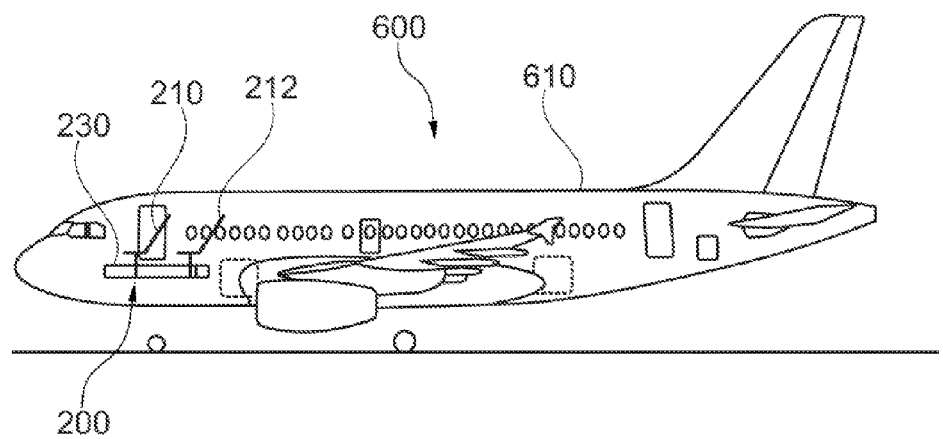
FIG. 5 shows an aircraft according to an exemplary embodiment of the invention.

FIG. 5 shows an aircraft with a passenger cabin, wherein the passenger cabin comprises a seat arrangement as described above and below.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

100 Rail cover
105 Cover element

107 Fixing element
109 Retaining lug
110 First longitudinal portion
120 Second longitudinal portion
121-124 Pivoting element
130 Flexible portion, joint
131 Rotation axis
135 Direction of pivoting
140 First cable channel
145 Partition wall
150 Second cable channel
190 Longitudinal direction
195 Transverse direction
197 Plane of extension of the cover element
198 Intersection of the plane of extension and the cover element
200 Seat arrangement
210 First seat
212 Second seat
213 Seat surface
214 Seat-rail longitudinal portion
220 Seat leg
225 Cover housing
230 Seat rail
231 Accommodation space
232 First projection
233 Second projection
240 Signal transmission line
242 Cable connection
244 First inserted position
246 Second inserted position
248 Cable accommodation space
600 Aircraft
610 Passenger cabin

The invention claimed is:

1. A seat arrangement for a passenger cabin of a means of transport, with the seat arrangement comprising:
   a seat rail;
   a first seat and a second seat;
   a rail cover, the rail cover comprising:
      a cover element for completely covering a longitudinal portion of the seat rail;
      wherein the cover element extends at least in part in a plane of extension formed by a longitudinal direction and a transverse direction of the rail cover;
      wherein the cover element comprises a first, rigid, longitudinal portion and a second longitudinal portion;
      wherein the first longitudinal portion and the second longitudinal portion are mechanically coupled together by a flexible portion, the flexible portion being flexible relative to the first rigid longitudinal portion;
      wherein the second longitudinal portion is configured to carry out a pivoting movement in a direction across the plane of extension;
   wherein the second seat is arranged behind the first seat in the longitudinal direction of the seat rail;
   wherein the first seat and the second seat are configured to be moved in an accommodation space of the seat rail in the longitudinal direction of the seat rail; and
   wherein the rail cover is arranged to completely cover the accommodation space of the seat rail on a seat-rail longitudinal portion extending from the first seat to the second seat;
   wherein the first seat comprises a first leg mechanically coupling the first seat to the seat rail and the second seat comprises a second seat leg mechanically coupling the second seat to the seat rail;
   wherein the first longitudinal portion of the rail cover extends in the direction of the seat leg of the first seat;
   wherein the second longitudinal portion of the rail cover extends in the direction of the seat leg of the second seat; and
   wherein the second longitudinal portion of the rail cover is arranged to carry out the pivoting movement when the second seat is moved in the direction of the first seat, so that as a result of the pivoting movement the second longitudinal portion is moved from a state in which the second longitudinal portion covers the seat rail to state in which the second longitudinal portion does not cover the seat rail;
   wherein during the pivoting movement the second longitudinal portion of the rail cover is configured to move along the seat leg of the second seat in the direction of a seat surface of the second seat and pivots about a pivot axis transverse to the longitudinal direction.

2. The seat arrangement of claim 1, wherein the second longitudinal portion comprises a plural number of pivoting elements;
   wherein the plural number of pivoting elements are arranged one behind the other in the longitudinal direction of the rail cover; and
   wherein two adjacent pivoting elements of the plural number of pivoting elements are mechanically coupled together by a flexible portion.

3. The seat arrangement of claim 1, wherein the flexible portion defines a rotation axis on which the pivoting movement of the second longitudinal portion takes place, said rotation axis extending so as to be parallel to the transverse direction of the rail cover.

4. The seat arrangement of claim 1, wherein the rail cover comprises a cable channel extending in the longitudinal direction of the rail cover.

5. The seat arrangement of claim 1, wherein the cover element is curved in the transverse direction.

6. The seat arrangement of claim 1, wherein the rail cover comprises a fixing element,
   wherein the fixing element is arranged on the cover element and extends in the longitudinal direction of the rail cover; and
   wherein the fixing element is configured to fix the rail cover with reference to the seat rail.

7. The seat arrangement of claim 6, wherein a cable channel extends in the fixing element.

8. The seat arrangement of claim 7, comprising a signal transmission line extending from the first seat to the second seat; and
   wherein the signal transmission line extends in the cable channel of the rail cover.

9. The seat arrangement of claim 8, wherein the second seat comprises a cable accommodation space;
   wherein the cable accommodation space is configured to accommodate a longitudinal portion of the signal transmission line when the second seat is moved in the direction of the first seat.

10. The seat arrangement of claim 8, comprising an electrical connecting element configured to establish an electrical connection to the signal transmission line for the purpose of transmitting electrical signals;
    wherein the electrical connecting element is arranged on the first seat or on the second seat.

11. The seat arrangement of claim 1, further comprising a cover housing arranged on the seat leg of the second seat, said cover housing configured to cover the second longitudinal portion of the rail cover in the state in which the rail cover does not cover the seat rail.

12. An aircraft, comprising a seat arrangement, the seat arrangement comprising:
- a seat rail;
- a first seat and a second seat;
- a rail cover, the rail cover comprising:
    - a cover element for completely covering a longitudinal portion of the seat rail;
    - wherein the cover element extends at least in part in a plane of extension formed by a longitudinal direction and a transverse direction of the rail cover;
    - wherein the cover element comprises a first, rigid, longitudinal portion and a second longitudinal portion;
    - wherein the first longitudinal portion and the second longitudinal portion are mechanically coupled together by a flexible portion, the flexible portion being flexible relative to the first rigid longitudinal portion;
    - wherein the second longitudinal portion is configured to carry out a pivoting movement in a direction across the plane of extension;
- wherein the second seat is arranged behind the first seat in the longitudinal direction of the seat rail;
- wherein the first seat and the second seat are configured to be moved in an accommodation space of the seat rail in the longitudinal direction of the seat rail; and
- wherein the rail cover is arranged to completely cover the accommodation space of the seat rail on a seat-rail longitudinal portion extending from the first seat to the second seat;
- wherein the first seat comprises a first seat leg mechanically coupling the first seat to the seat rail and the second seat comprises a second seat leg mechanically coupling the second seat to the seat rail;
- wherein the first longitudinal portion of the rail cover extends in the direction of the seat leg of the first seat;
- wherein the second longitudinal portion of the rail cover extends in the direction of the seat leg of the second seat; and
- wherein the second longitudinal portion of the rail cover is arranged to carry out the pivoting movement when the second seat is moved in the direction of the first seat, so that as a result of the pivoting movement the second longitudinal portion is moved from a state in which the second longitudinal portion covers the seat rail to a state in which the second longitudinal portion does not cover the seat rail;
- wherein during the pivoting movement the second longitudinal portion of the rail cover is configured to move along the seat leg of the second seat in the direction of a seat surface of the second seat and pivots about a pivot axis transverse to the longitudinal direction.

* * * * *